No. 12,823.

REISSUED JULY 7, 1908.

L. L. HEPBURN.

REPEATING FIREARM.

APPLICATION FILED APR. 18, 1908.

2 SHEETS—SHEET 1.

Witnesses:
Chas. A. Peard
Ralph C. Parnell

Inventor
L. L. HEPBURN
By his Attorney
Bartlett Brownell & Mitchell

No. 12,823. REISSUED JULY 7, 1908.

L. L. HEPBURN.

REPEATING FIREARM.

APPLICATION FILED APR. 18, 1908.

2 SHEETS—SHEET 2.

Witnesses:
Chas. A. Pearce
Ralph C. Purnell

Inventor
L. L. HEPBURN
By his Attorneys
Pattee Brown & Nickelsen

UNITED STATES PATENT OFFICE.

LEWIS L. HEPBURN, OF NEW HAVEN, CONNECTICUT, ASSIGNOR TO THE MARLIN FIREARMS COMPANY, OF NEW HAVEN, CONNECTICUT, A CORPORATION OF CONNECTICUT.

REPEATING FIREARM.

No. 12,823. Specification of Reissued Letters Patent. Reissued July 7, 1908.

Original No. 882,563, dated March 24, 1908, Serial No. 366,297. Application for reissue filed April 18, 1908. Serial No. 427,840½.

*To all whom it may concern:*

Be it known that I, LEWIS L. HEPBURN, a citizen of the United States, and residing at New Haven, county of New Haven, State of Connecticut, have invented new and useful Improvements in Repeating Firearms, of which the following is a specification.

My invention relates to improvements in fire arms, particularly of the repeating "take-down" type.

This invention is essentially an improvement on the take-down construction shown in my former patent No. 584,177, and among the objects, is to provide a longer and hence more positive connection between "take-down" parts.

Figure 1:
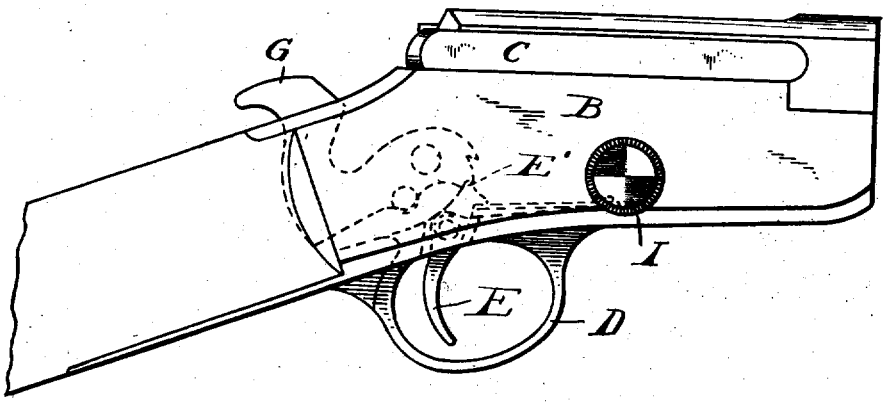
Figure 2:
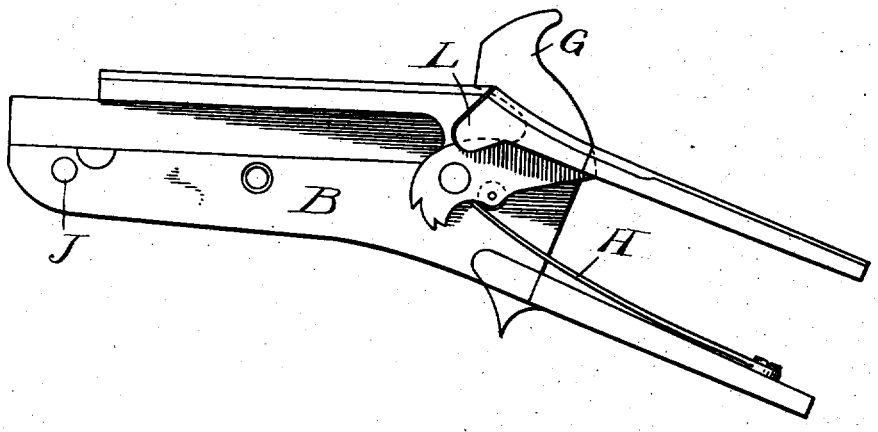
Figure 3:
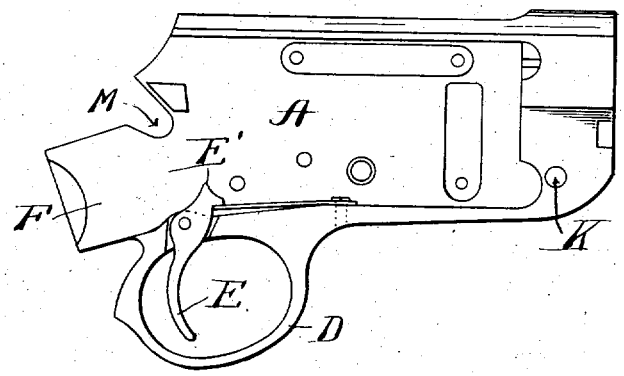
Figure 4:
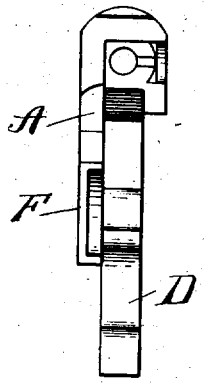
Figure 5:
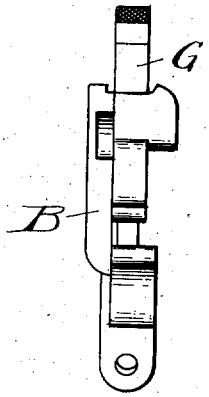

In the accompanying drawings, Figure 1 is a side elevation of the receiver portions assembled. Fig. 2 is a view of the opposite side of the detachable stock portion of the receiver. Fig. 3 is a view of the inner side of the barrel portion of the receiver detached. Fig. 4 is a rear elevation of the part shown in Fig. 3. Fig. 5 is a front elevation of the part shown in Fig. 2.

In this construction, as in my former construction, the receiver is divided longitudinally and vertically, so that one part thereof extends rearwardly from the barrel, while the other part extends forwardly from the stock. These parts fit together and when assembled are held against lateral displacement by the over-lapping of the ends. In the present construction it is my purpose to increase the length of the over-lapping ends so as to afford great rigidity. I also form the trigger guard on that part of the receiver which is removable with the barrel, whereas in my former patent this trigger guard is carried by the stock portion of the receiver. In the present construction I also hinge the trigger to the removable barrel portion of the receiver. By thus separating the hammer and trigger, it is impossible when taking down the gun, to leave the hammer cocked. This relieves the hammer spring of undue strain, increases its life, and avoids all danger of snapping the hammer from its cocked position, when the gun is taken down.

A represents the removable barrel portion of the receiver, the same constituting one side plate therefor. B represents the removable barrel portion of the receiver, the same constituting the opposite side plate therefor.

C is the breech-block, similar to that shown in my former patent. This breech-block is carried by the barrel portion when the gun is taken down.

D is the trigger guard carried by the plate A.

E is the trigger pivoted and spring-pressed in the usual manner, the part E′ being arranged to coact with the hammer when the parts are assembled.

F is an elongated rear extension on the plate A, forming part of the overlapping joint.

G is the hammer, pivoted in the usual manner and pressed forward by the spring H.

I is a bolt, or equivalent fastening, arranged to pass through both plates A and B and secure them when assembled.

J is a projection or tenon at the forward end of the part B, arranged to take into a cavity K in the opposite part. The stock portion is suitably recessed to receive the rear extension F of the opposite part.

L is a side projection or tenon on the stock part, arranged to fit into a suitable cavity M on the opposite part. It is obvious to any mechanic skilled in this art, that the mere reversal of these tenons and recesses involves no substantial difference and is within the scope of this invention. It is also equally obvious that the form and arrangement of these projections or tenons is immaterial.

In assembling the gun, the separable parts are put together substantially as described in my aforesaid patent, and the bolt I is set up to hold them in fixed engagement. It will be observed that the barrel portion and stock portion of the receiver, when assembled, overlap to a very considerable distance, and consequently are better able to withstand side strains. The length of the bearing also permits me to form the trigger guard integrally with the barrel portion, which, in some instances, and for the foregoing reasons, is a desirable construction. By this arrangement also the taking down of the gun affords at once access to the hammer and trigger pivots and springs, for the purposes of cleaning and lubrication.

I have not shown or described the various parts of the cartridge handling mechanism, since appropriate parts are shown and described in detail in my patent Number 776,243, in which it will be seen that the action work is operated by a sliding action rod entering the receiver at its forward end.

What I claim is:

1. In a firearm, a receiver divided so as to form two independent separable members, means for detachably securing said members together, a trigger carried by one of said separable members, a hammer carried by the other separable member, said hammer and trigger being separated when the gun is taken down.

2. In a firearm, a receiver divided longitudinally to form two independent separable members, means for detachably securing said members together, a trigger carried by one of said separable members, and a hammer carried by the other separable member, said hammer and trigger being separated when the gun is taken down, a portion of the member carrying the trigger overstanding a portion of the hammer when the gun is assembled.

LEWIS L. HEPBURN.

Witnesses:
R. C. MITCHELL,
CHAS. A. PEARD.